M235A XR 3,610,820 /1660

United States Patent

[11] 3,610,820

[72] Inventor Svend Aage Lund
Birkerod, Denmark

[21] Appl. No. 697,445
[22] Filed Jan. 12, 1968
[45] Patented Oct. 5, 1971
[73] Assignee Akademiet for de tekniske Videnskaber
Glostrup, Denmark
[32] Priority Jan. 13, 1967
[33] Denmark
[31] 229/67

[54] METHOD AND SYSTEM FOR RECORDING, REPRODUCING AND ANALYZING PICTURE INFORMATION BY ULTRASONIC-PULSE-ECHO SECTIONAL VIEW EXAMINATIONS
13 Claims, 5 Drawing Figs.

[52] U.S. Cl. .......... 178/6.6 A, 73/69, 178/DIG. 1
[51] Int. Cl. .......... H04n 3/16, H04n 5/78, G01n 29/00
[50] Field of Search .......... 178/DIG. 1, 6, 6.8, 6.6 A, 6.6; 73/69; 340/174.1

[56] References Cited

UNITED STATES PATENTS

| | | | |
|---|---|---|---|
| 2,955,157 | 10/1960 | Young | 178/6.6 |
| 3,003,628 | 10/1961 | Diamond et al. | 73/69 |
| 3,038,329 | 6/1962 | Miller | 73/69 |
| 3,051,777 | 8/1962 | Lemelson | 178/6.6 |
| 3,153,699 | 10/1964 | Plass | 178/6.8 |
| 3,168,733 | 2/1965 | Fryklund | 178/6.8 |
| 3,179,745 | 4/1965 | Stone, Jr. | 178/6.8 |
| 3,196,207 | 7/1965 | Davies | 178/6.8 |
| 3,346,065 | 10/1967 | Bourquard | 73/69 |
| 3,036,151 | 5/1962 | Mitchell et al. | 178/6.6 |
| 3,378,825 | 4/1968 | Offner | 179/100.2 X |
| 3,480,932 | 11/1969 | Branostadter | 340/174.1 |

*Primary Examiner*—Bernard Konick
*Assistant Examiner*—Steven B. Pokotilow
*Attorney*—Robert E. Burns

ABSTRACT: By Ultrasonic-pulse-echo sectional view examinations the complete picture information is recorded by repeated, superimposed, synchronous recordings on an endless magnetizable signal carrier, and the recorded information is then reproduced on a video monitor.

INVENTOR.

BY

PATENTED OCT 5 1971 3,610,820

METHOD AND SYSTEM FOR RECORDING, REPRODUCING AND ANALYZING PICTURE INFORMATION BY ULTRASONIC-PULSE-ECHO SECTIONAL VIEW EXAMINATIONS

BACKGROUND OF THE INVENTION

1. Field of the Invention

The invention relates to a method of recording, reproducing and analyzing picture information by ultrasonic-pulse-echo sectional view examinations of objects such as welded seams or other inhomogeneous bodies which consist of at least two materials or substances having internal joint surfaces abutting to each other, and in which picture information corresponding to the outer surface of the object or body and echo pulses from the said internal joint surfaces are recorded on a signal carrier of magnetizable material by means of a video recorder, in such manner that reproduction and analysis of the picture information may subsequently be obtained in the form of complete sectional views on the viewing screen of a video monitor.

2. Description of the Prior Art

Ultrasonic sectional view examinations are known and used, for example, in nondestructive technical material investigations of the aforesaid objects, but they may also be utilized in medical diagnostication or in the veterinary field or in livestock breeding.

An ultrasonic sectional view is obtained by means of an ultrasonic head which acts as a combined sound transmitter and sound receiver and is successively placed at various locations with respect to the surface of the object or body, the said ultrasonic head transmitting short directional ultrasonic pulses into the object or body to be examined. At the joint surfaces in the object or body the ultrasonic pulses are reflected more or less intensely, dependent upon a number of well-known conditions such as density and sound velocity in the two materials abutting to the joint surface and in accordance with known laws. The reflected pulses are received by the sound head as echoes which are used to produce a presentation by means of a special ultrasonic sectional view device containing a cathode ray tube with a viewing screen and adapted in such manner that the movements of the sound head in relation to the object or body are reproduced on a suitable scale by movement of a first spot of light which registers the location of the sound head in relation to the object or body. The echoes received by the sound head are reproduced by other spots of light having a distance from the first light sport proportional to the time that has lapsed since the ultrasonic pulse was transmitted until the reception of the echo and in a direction conforming to the direction of the sound in the object or body. By causing the sound head to scan a suitable part of the surface of the object and by selecting suitable directions of sound, the surfaces of the object and its internal joint surfaces will be reproduced in the form of the aforesaid spots of light on the oscilloscopic screen. The said light spots are of very brief duration, appearing one at a time, but may be made visible as a combined sectional view for example, by subjecting the screen to photographic exposure for a suitable time interval by means of a photographic camera with an open shutter, or by using an oscilloscopic screen having a long afterglow, or by means of a so-called storage screen on which the picture is retained by electronic means until it is intentionally erased.

The known methods for reproducing ultrasonic sectional views have, however, a number of drawbacks, of which in particular the following should be pointed out:

In sectional view reproductions obtained by subjecting the oscilloscopic screen to photographic exposure with an open camera shutter, it is impossible to follow the formation of the sectional view itself and thereby to act upon the quality of the picture, for example by rescanning faintly indicated areas.

On photographing with an open camera shutter a uniform movement of the sound head is very necessary, since the film is susceptible to intense local overexposure unless the scanning is performed at a rather constant velocity.

The scanning velocity and the necessary brightness of the briefly occurring light spots on the oscilloscope screen have to be determined experimentally in each particular case, and the strength of the ultrasonic echoes received cannot be directly deduced from the developed film, since its degree of signal density is dependent upon the scanning velocity and the number of times a spot of light falls upon each individual location of the film.

With the use of an oscilloscopic screen having a long afterglow it is also impossible to obtain an exact combination of echo strength and light intensity of the persistent screen picture, and such a screen is unsuitable since it must either have a relatively short afterglow, by which that part of the sectional view which is formed first is vanishing when the last part is formed, or, alternatively, it must have a long afterglow, which involves an inconvenient period of waiting for a sectional view produced to be so faded as to permit the formation of a new picture without disturbances due to the picture first formed.

With the use of the so-called storage screen, in which the picture is retained on the screen by electronic means, it will generally only by possible to reproduce light or darkness, that is, all echoes above a certain strength are reproduced as light spots of identical brightness, whereas echoes below the said limit are not reproduced at all. Only with very costly storage screens it is possible to reproduce a limited number of medium tones. Furthermore, storage screens are generally rather coarse grained.

All of the aforesaid methods embody the further drawback that they only permit the reproduction of a very limited part of the picture information obtainable by a single scanning. If reproduction of an increased part is desired, the scanning has to be repeated, often a large number of time, with other adjustments of sensitivity of the ultrasonic device.

If it is desired to preserve the sectional view for purposes of evidence or filing, the picture has to be photographed at each individual adjustment of sensitivity.

The known methods have the additional serious drawback that in all areas where faint as well as intense superimposed indications have been obtained during the scanning, it will only be possible to see and record the intense indications which may thus conceal important details of the sectional view.

It is known to register the signals from an ultrasonic test device, for example by converting these into electric voltages, which are then recorded on a paper tape or the like by means of writers.

By the known technique it will likewise by possible to register the signals transmitted by the ultrasonic device on a magnetizable signal carrier by means of a conventional recorder or a special video recorder.

By subsequently playing back the signal carriers it will then by possible to reproduce the ultrasonic pulses in their correct sequence of time, either in the form of electric signals or in the form of light spots of short duration on the viewing screen of a video monitor, in the latter case further with the identical coordinate location as previously on oscilloscopic screen on the ultrasonic device during the original scanning operation.

Such a recording, however, in the most favorable case, will be capable of giving only a visual reproduction of the scanning operation in sequence of time similar as in the case of shooting and subsequent projection of a cinematographic film of the oscilloscopic screen during the performance of the scanning operation proper, a reproduction that will be wholly without interest for practical purposes.

With the known technique of recording and registration it is consequently not possible to record the picture information obtained in such manner that at a subsequent time it may be reproduced an analyzed, if desired, in the form of a single, complete sectional view containing all the signals received, regardless whether these have been recorded at widely varying times during the original scanning.

SUMMARY OF THE INVENTION

It is the object of the present invention to devise a method in which all the aforesaid drawbacks have been relieved, and an essential feature of the method according to the invention is that the complete picture information is recorded successively as the examination proceeds by repeated, superimposed, synchronous recordings on the preferably endless magnetizable signal carrier, after which the information recorded on the signal carrier, or parts of the said information, is reproduced on a video monitor to suit requirements.

As a result, all ultrasonic echo pulses received during the entire scanning through a single sectional plane of the object examined—an operation that may last several minutes—are recorded as superimposed video signals on the signal carrier in one and the same picture track, the length of which actually corresponds to a complete video picture, and in such manner that any given point of the picture surface corresponds to one, and only one, point of the picture track on the signal carrier.

When the scanning of the object has been completed, all the echo pulses received, both the very weak and the very powerful, will thus be available, summed up in a single track of the magnetizable signal carrier corresponding to a single complete video picture of a cross section of the object.

As a further result, it will be possible at any later time, as often and as long as it is desired, to reproduce and analyze the total picture information as one stationary, fused sectional view on the viewing screen of a video monitor by playing back the signal carrier.

By reproducing the entire collected picture information in the aforesaid manner, or parts of it only, for example by omitting very weak or very powerful echo pulses, it is furthermore possible to obtain very distinct sectional views and to make a thorough technical analysis of these.

In a very suitable embodiment of the method according to the invention, in which the sectional view information is reproduced as brief light spot flashes on the viewing screen of an oscilloscope, the said viewing screen is scanned by a video camera and is given an afterglow of sufficient duration to ensure a video signal for each light spot, the signals emitted by the video camera being subsequently via a pulse former, on the signal carrier, which may consist of a tape, a disc or a drum of magnetizable material.

The result obtained is a very simple and convenient production and transmission of the video signals which correspond to the ultrasonic echo pulses and which are to be summed up synchronously in a single picture track of the signal carrier.

The echo pulses formed occur one at a time and are of very brief duration, that is, a few microseconds, but when the corresponding, individually brief flashes are retained as mentioned by means of an afterglow of the picture screen for sufficient time to ensure their registration by the video camera, a completely safe transmission of the total picture information to the signal carrier will be obtained simultaneously.

In another embodiment of the method according to the invention the echo pulses of the picture information are split up and registered in a fixed number of consecutive amplitude level ranges, the said pulses corresponding to each particular level range being successively reproduced by the oscilloscopic screen which has such an interval of afterglow that only the persistent picture last formed at any time, and showing each individual light spot but not persistent pictures originating from preceding pictures of corresponding echo pulses, gives rise to a video signal by scanning by means of the video camera. The signals transmitted by the video camera are then recorded by the video recorder as standard pulses having uniform amplitudes in a number of frames corresponding to the number of amplitude level ranges, each of the said frames corresponding to an amplitude level range, with one or more frames to suit requirements being subsequently reproduced on the video monitor at a light intensity which is regulatable for each individual frame.

The result obtained is a rational registration of the spots of light which correspond to weak echo pulses in one trace, and the spots of light which correspond to somewhat more intense echo pulses in another trace, and so on, so that for each trace only light spots corresponding to substantially the identical intensity of echo pulses are registered and subsequently reproduced. Thus, at the subsequent reproduction, the sectional views obtained are substantially more distinct because light spots from intense echo pulses no longer cover light spots from weaker echo pulses. On the contrary, it is possible to make a suitable selection of certain amplitude ranges by reproducing a combination of two or more of the frames corresponding to the amplitude level ranges, by which it becomes possible to make a point of reproducing internal joint surfaces of particular interest in the object or body.

In a third embodiment of the method according to the invention the scanning operation of the video camera is controlled by line and picture synchronization pulses prerecorded on the signal carrier, as a result of which each of the several times repeated, superimposed, synchronous recordings on the signal carrier will coincide exactly.

In a fourth embodiment of the method according to the invention the line and picture synchronization pulses produced by the video camera itself are recorded on the signal carrier during the prior passage of the said carrier through the video recorder, the synchronization signals thus recorded being utilization for controlling the scanning operation of the video camera during the subsequent registration of the picture information; by this simple means the coordinate systems of the pictures will always coincide.

In a fifth embodiment of the method according to the invention a number of sectional views showing consecutive parallel sectional views of the object or body and recorded on the same signal carrier are reproduced on the screen of the video monitor, staggered stepwise in relation to one another, preferably in the direction of the diagonal of the video monitor screen in such manner and with the individual sectional views spaced apart in such manner as to produce a kind of axonometric representation on the screen of the video monitor, by which a three-dimensional representation of the ultrasonic sectional views is obtained.

In a sixth embodiment of the method according to the invention the stepwise staggered sectional views are reproduced at varying intensity of light, as a result of which prominence may be given to sectional views of particular importance on the background of views of less importance.

In a seventh embodiment of the method according to the invention the stepwise staggered sectional views are reproduced at decreasing intensity of light in such manner that the reproduction of the first sectional view has the greatest intensity of light and the subsequent views are of an intensity of light decreasing stepwise, by which a visual improvement of the three-dimensional representation is obtained.

The invention is furthermore concerned with a system for carrying out the above described method. A system according to the invention has an ultrasonic device which by means of an oscilloscopic viewing screen produces sectional view information from a movable sound head in the form of light spots on the said screen in a fixed system of coordinates and on a fixed scale. The system has the essential feature that a video camera is optically coupled to the said viewing screen which has a period of afterglow in such manner that only such persistent picture of each light spot, as is the last formed at any time, but not persistent pictures originating from preceding pictures of corresponding echo pulses, produces a video signal by scanning of the camera. The output circuit of the video camera is coupled via a pulse generator to a manual switch which has at least four contact positions, of which one connects the video camera to a video recorder, the second one connects the camera to a video monitor, the third position connects the camera both to the recorder and to the monitor, and the fourth position connects the video recorder to the video monitor.

As a result, sectional view information of high-quality may be recorded on the video recorder and be transmitted either direct from the camera to the recorder or from the camera to the monitor in preparation for a subsequent recording on the video recorder, or from the camera to both recorder and monitor for supervising the recording, or—by playing back—direct from the recorder to the monitor.

In one embodiment of the system according to the invention the video head of the video recorder and the picture synchronization head are coupled to the synchronizing terminals of the video camera via two AND gates which are controlled by a 100 countercircuit, by which a synchronization of the video camera from the video recorder during the several repeated recordings of the picture information is obtained.

In another embodiment of the system according to the invention a delaying circuit in the form of a monostable multivibrator is inserted between the synchronizing oscillator and synchronizing circuit in the video camera, by which picture synchronization pulses and line synchronization pulses are delayed for a suitable time corresponding to the interval of afterglow in the oscilloscope system to ensure that the picture information recorded in a frame remains undisturbed by the afterglow of the picture information provided by the preceding frame.

In a third embodiment of the plant according to the invention the video camera is coupled to the video recorder through a 100 countercircuit and two AND gates in such manner that the first picture synchronizing pulse from the video camera establishes connection for line and picture synchronization pulses from the video camera to the video recorder, whereas picture synchronization pulse No. 100 establishes a connection for line and picture synchronization pulses from the video recorder to the video camera.

As a result, synchronization pulses from the video camera corresponding to 100 frames may be recorded on the magnetizable signal carrier, after which the synchronizing signals thus recorded may be utilized for controlling the video camera to ensure a synchronous superimposing of the repeated recordings.

In a fourth embodiment of the system according to the invention the video camera and the video recorder are connected in such manner through a switch circuit controlled by the picture blanking pulse that the front edge of the said blanking pulse closes the switch circuit for the passage of the line synchronization pulse to the camera, after which the rear edge of the blanking pulse closes the switch circuit for the passage of video signals.

As a result, the video signals recorded on the video recorder may be utilized for controlling the video camera simultaneously with new video signals being recorded.

In a fifth embodiment of the system according to the invention an input terminal of a 10-counter and selector circuit, which is adapted to count picture synchronization pulses, is connected to the playback channel of the video recorder for picture synchronization pulses, whereas another input terminal of the said 10-counter and selector circuit is connected to an AND gate which is connected to the sound head of the video recorder for soundtracks. One of outputs of the 10-counter circuit is connected to a first input of a row of level gates and through a common pulse generator and an AND gate to the intensity modulation input of the oscilloscope, while another input in each of the row of level gates is connected to the output of the ultrasonic device.

As a result, the picture information is divided into a number of amplitude level ranges corresponding to the number of outputs provided in the 10-counter and selector circuit, each level range being recorded during the several repeated synchronous recordings in a corresponding separate track of the signal carrier.

In a sixth embodiment of the system according to the invention each individual circuit in the row of level gates is provided with amplitude selecting means for the signal from the video output of the ultrasonic device; as a result, each individual circuit of the row of level gates only admits pulses located within the respective ranges of amplitude levels when the said pulses via a pulse former are to be transmitted to the intensity modulation input of the oscilloscope. The amplifier of the ultrasonic device may have a linear logarithmic or exponential characteristic, such that the amplitude level ranges may be adapted to the contrast of the picture information and to the desired contrast of the recorded picture information reproduced by the video monitor.

In a seventh embodiment of the system according to the invention the other row of outputs of the 10-countercircuit are each connected to a first input of a row of AND gates, the other input of which is connected to the switch and the outputs of which are connected through intensity regulating circuits to the video monitor that is common for the said AND gates.

As a result, the picture information recorded for each amplitude level range may be reproduced as a complete picture on the video monitor, but with an intensity regulatable for each level range, so that the weakest or the most intense or any combination of the amplitude level ranges whatever may be selected on the reproduction on the viewing screen of the video monitor. As a result, very important joint surfaces may be given added intensity and less important ones be damped down in intensity, which may highly support the analysis of the picture information obtained.

In an eighth embodiment of the system according to the invention an extra monitor is connected to the output of one or more of the circuits of the intensity regulation; as a result, one or more amplitude level ranges may be kept under special observation during recording or playback of the total picture information.

In a very suitable embodiment of the system according to the invention, in which the ultrasonic head is controlled to move in a number of parallel sectional planes in relation to the object or the body, a selection circuit is adapted to pick out, via a manual switch and an AND gate, picture synchronization pulses in a number of groups corresponding to the number of sectional planes, of which groups each group belongs to the picture information from a sectional view, the said switch being connected to the deflecting means of the electron beam of the oscilloscope in such manner that the reproduction of each sectional view on the screen of the oscilloscope may be staggered in parallel a certain distance apart in the numerical order determined by the sequence in which the sectional views are recorded.

As a result, the picture information recorded may on subsequent playback be displayed as a kind of axonometeric reproduction giving a three-dimensional effect of the picture on the monitor screen so as to further support the analysis of the picture information obtained. It will be appreciated that a corresponding effect is obtainable by staggering the picture reproduction of the individual sectional views on the monitor screen itself.

BRIEF DESCRIPTION OF THE DRAWING

The invention will now be further described with reference to the drawing, in which.

Figures 1, 2:
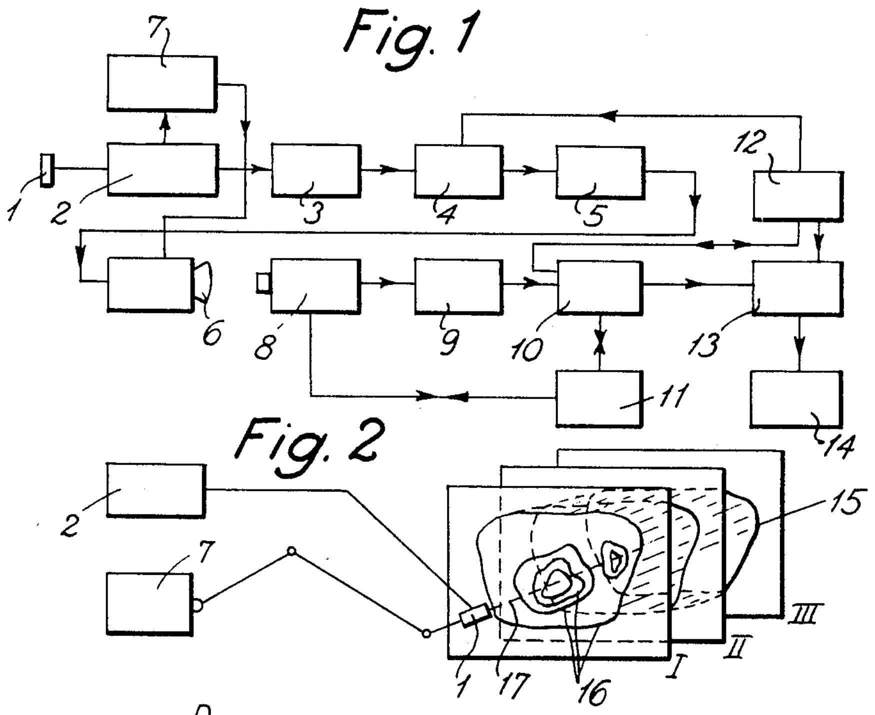
FIG. 1 is a block diagram of a system for carrying the method according to the invention into effect.
FIG. 2 is a part of the block diagram of FIG. 1, with an ultrasonic head controlled to move in a number of parallel sections of an object or body to be examined.

The plant according to the invention consists as shown in FIG. 1 of a pulse-echo-ultrasonic device 2 of known type and of the kind which produces picture information from a movable ultrasonic head 1 as sectional views in the form of spots of light on the viewing screen of an oscilloscope in a fixed system of coordinates and on a fixed scale in relation to an object or body 15 to be examined by scanning by an ultrasonic head 1 in various planes of movement I, II, ... The ultrasonic beam transmitted by the sonic head 1 will be reflected by the joint surfaces 16 and be received by the sonic head as echo signals which produce the said spots of light on the oscilloscopic screen with an intensity depending on the materials abutting to the said surfaces and at a distance apart which is proportional to the time interval between the transmission of the ultrasonic pulse from the sonic head and the reception of the echo signal. The pulse echo head 1 is used to obtain an individual sectional view, for example through the plane I, by moving the head 1 with respect to the object so that the directional axis 17 of the head remains in the sectional plane I, while echo information is obtained from a plurality of angles. Then, additional sectional views can be obtained by shifting the head 1, perpendicularly to its axis 17, until the head has its axis disposed in a parallel sectional plane II, whereupon the head is moved so that its axis remains in that plane II until sufficient information is recorded. Similarly, additional sectional views III, etc., are obtainable in the same manner.

Figure 3:
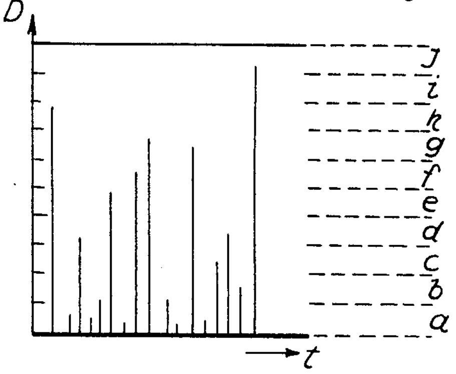
FIG. 3 is a diagrammatic view giving a graphic representation of the amplitude variations of echo pulses from joint surfaces in the said object or body for an arbitrarily selected direction of the ultrasonic radiation from the sound head and a division of amplitude level ranges *a*, *b*, ...

FIG. 3 shows, diagrammatically, the amplitude D of a number of echo signals corresponding to a single direction 17 of ultrasonic radiation through a single one of the sectional planes indicated in FIG. 2. An ultrasonic scanning unit 7 connected to the ultrasonic device controls the electron beam of the oscilloscope in such manner that the light spot of each echo is reproduced on the screen at its proper position, giving on the screen a conforming representation of both the outer contour of the body and of the dividing lines between the joint surfaces, when the sectional plane involved has been completely scanned. The echo pulses from the ultrasonic device 2 are transmitted to an amplifier 3, which, in accordance with requirements, may be linear, logarithmic or exponential. Hence the pulses are transmitted to a dividing circuit 4 of the level ranges, the said circuit consisting of a number of gate circuits, each of which separately permits the passage of pulses within given level ranges *a*, *b*, *c*, ... *j* as indicated in FIG. 3 and divides the pulses according to a number of level ranges abutting to each other. Having passed the level range dividing circuit 4, the pulses are fed to a pulse former 5 and then to a separate oscilloscope 6 in which the pulses produce light spots with a location on the screen determined by the ultrasonic scanning unit 7 in a manner known per se. The pictures formed by the light spots on the screen of the oscilloscope 6 are scanned by means of a video camera 8. If the oscilloscope screen were wholly without afterglow, it would not be possible to obtain, from the video camera 8 video signals corresponding to the individual spots of light, since these are of very brief duration in proportion to the scanning of the lines. The oscilloscopic screen must therefore have an afterflow of such duration that upon scanning there is obtained a video signal from the persistent picture last formed, but not from persistent pictures from preceding echo pulses.

With a repetition frequency for the transmission of ultrasonic pulses of, say 1,250 pulses/sec. and a frame frequency of 25 frames/sec., each having 500 lines there will be a transmission of 50 ultrasonic pulses per frame or an ultrasonic pulse for every 10 lines. An afterglow interval of the order of magnitude corresponding to 20–30 lines will thus be suitable.

The video signal from the camera 8 is transmitted to a pulse former 9 in which the pulses corresponding to the spots of light are converted into short standard pulses of identical amplitude and length, the said pulses being again fed to a video recorder 10, in which they are recorded on a preferably endless signal carrier 18 of magnetizable material in a number of frames for each sectional plane I, II, ... corresponding to the number of amplitude level ranges *a*, *b*, ... of the dividing circuit 4 of the amplitude level range. Since all of the frames scanned by the camera 8 are to be recorded by the signal carrier 18 in a number of frames corresponding to the number of amplitude level ranges *a*, *b*, ... by repeated superimposed synchronous recordings, it is necessary to synchronize the camera 8 by means of picture and line synchronization signals from the signal carrier 18.

Figure 4:
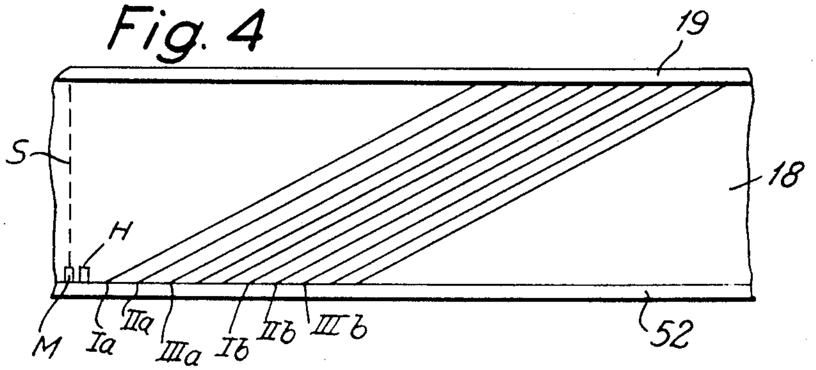
FIG. 4 shows a signal carrier of magnetizable material for use in the plant according to the invention, and with tracks indicating the picture information recorded on the signal carrier.

This may be performed in the manner that, at the first passage of the signal carrier, the synchronization signals of the camera 8 are recorded by the signal carrier 18, no video signal being recorded during the first passage, after which the subsequent scannings of the camera are synchronized by means of the synchronization signals recorded by the signal carrier, a switch circuit 11 causing the video head to play a line synchronization signal alternately with the recording of a video signal corresponding to a line distance. By means of a control unit 12 the first frame corresponding to Section I is recorded as a track I*a* containing the standard pulses corresponding to amplitude level *a;* the second frame is then recorded as a track I*b* with the standard pulses corresponding to amplitude level range *b*, and so on, the tracks I*c*–I*j* corresponding to the following amplitude level ranges *c–j*. When a frame has been recorded corresponding to each of the amplitude level ranges *a–j*, the process is repeated, a special main synchronization signal H on the sound track 52 of the signal carrier and the picture synchronization pulses ensure that new pulses corresponding to the first amplitude level range are always recorded superimposed on the first recording of the first frame, and so on. As a result, when the scanning of the sectional views of an individual sectional planes I, II ... has been completed, the frames I*a*–I*j*, II*a*–II*j* .. corresponding to the individual level ranges *a–j* will contain the total picture information distrubuted on a number of tracks as indicated in FIG. 4, a track for each amplitude level range of each sectional view.

It will be appreciated from the above that intense ultrasonic pulses will not be capable of concealing weak ultrasonic pulses, since the individual frames all contain information sorted according to pulse amplitude, just as "over exposure" of the signal carrier cannot occur, for example due to the ultrasonic head being stationary for a longer period. When at a given point of the signal carrier a signal of standard magnitude has been recorded, it will be possible, owing to the magnetic properties of the signal carrier, to record an unlimited number of signals of standard magnitudes superimposed on the said signal without thereby altering the picture recorded.

When the scanning of the sectional views has been completed, the signal carrier is ready for playback on a video monitor 14, the frames corresponding to the individual amplitude level ranges *a–j* being reproduced, by means of the control unit 12 and intensity control circuits 13, at varying and regulatable intensity. The first frame, for example I*a*, may be reproduced at an intensity corresponding to amplitude level range *a*, second frame I*b*, at an intensity *b* and so on. By alternatively making the intensity of the individual frames regulatable between zero and a maximum value by means of the intensity control circuits 13 it is possible wholly to dispense with one or more amplitude level ranges, while giving prominence to others, so that just that part of the picture information which is the more valuable to the analysis is given preference.

By means of a manual switch it is possible to alternate between recording an reproduction without the special starting process in which the synchronizing pulses of the video camera are recorded on the tape. That is, it is possible to continue an interrupted recording if the reproduction of information already recorded shows that there are inadequately indicated areas.

By staggering the reproduction of the picture information from the parallel sections I, II .. in a given direction in relation to each other, for example in the direction of the diagonal of the screen so that the space between the individual pictures corresponds to the spaces between the individual parallel sections of the object or body, a kind of axenometric representation is obtainable, giving a three-dimensional effect of the ultrasonic picture on the screen of the monitor, which provides support for the analysis of the picture information. A corresponding effect is obtainable by recording the sectional views without staggering on the screen of the oscilloscope, the staggering being subsequently carried through on the reproduction on the monitor screen.

Figure 5:
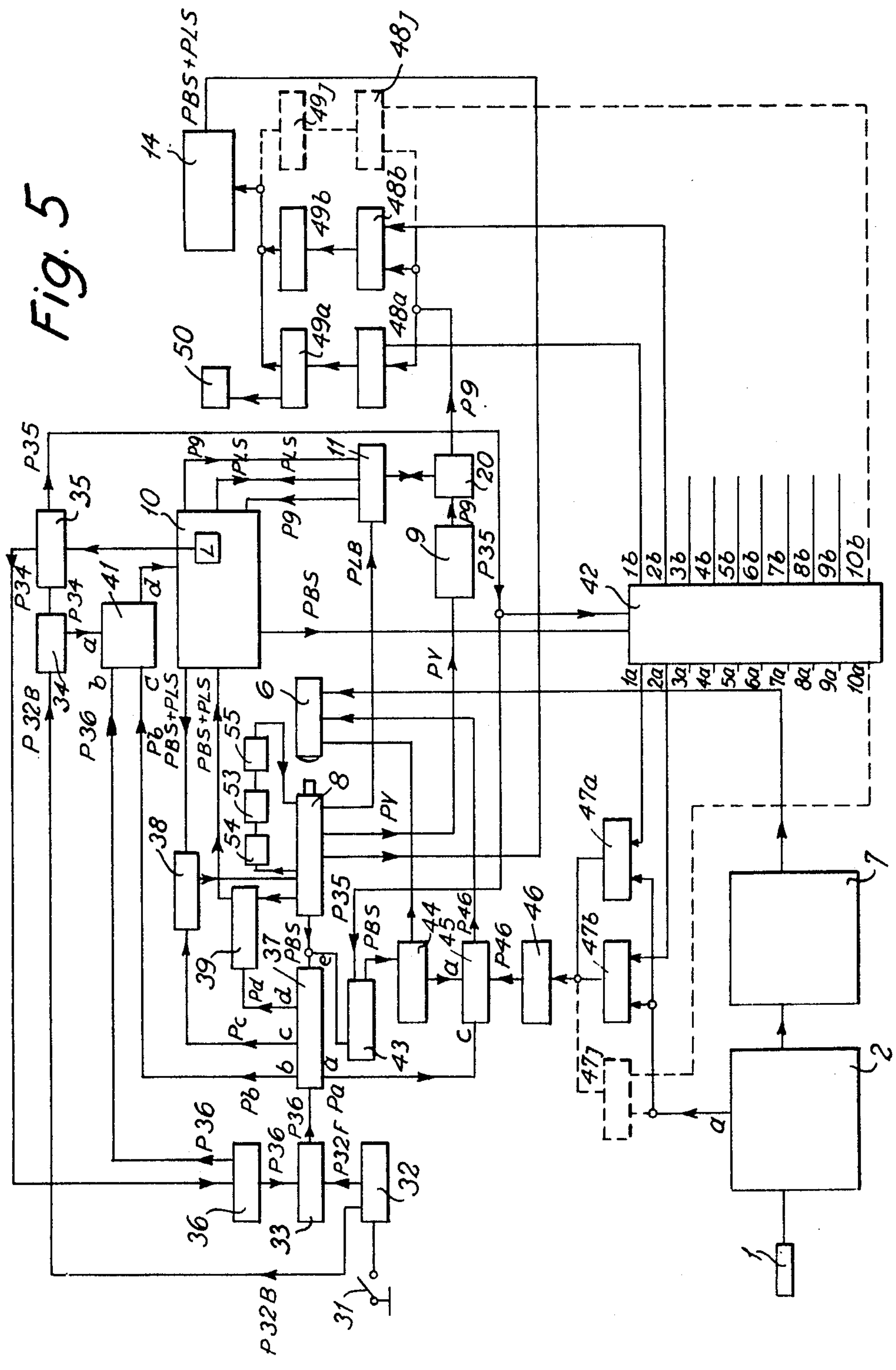
FIG. 5 is a detailed block diagram of the plant according to the invention.

The operation of the system will now be described in detail with reference to FIG. 5.

RECORDING

The preferably endless signal carrier 18 of the video recorder 10 is put into motion in normal manner, and when the normal velocity has been attained a monostable multivibrator 32 is activated by means of a starting contact 31, the said multivibrator 32 emitting a pulse P 32 the front edge P 32 F of which opens an AND gate 33, while its rear edge P 32 B activates a monostable multivibrator 34 which emits a pulse P 34. A marking signal M, produced by magnetic means on the sound track 52 of the signal carrier 18 when the possible assembly points of the signal carrier pass the sound head L of the recorder 10, is coupled through an AND gate 35 to a monostable multivibrator 36, which subsequently emits a pulse P 36. Since the AND gate 33 is open, the pulse P 36 is passed through the said gate to a 100 countercircuit 37, the blocking of which is consequently cancelled. The said countercircuit 37 functions partly to permit the passage of a first picture synchronization pulse P*b*, which is impressed on a branch *b* of the countercircuit, partly to block an AND gate 38 by means of another pulse P*c*, which occurs via a branch *c* and to open an AND gate 39 with a third pulse P*d* via a branch *d* during the first 100 picture synchronization pulses PBS. When the said 100 PBS have been played back, conditions are reversed, that is gate 39 is blocked and gate 38 is opened. The picture synchronization pulses PBS are transmitted from the video camera 8 and passed to a branch *e* of the countercircuit 37. The AND gates 38 and 39 are double, there being one AND gate for the line synchronization pulses PLS of the camera and another AND gate for the picture synchronization pulses PBS of the camera. The camera has to transmit picture synchronization and line synchronization pulses in such manner that the distance between the frames is made longer than normal, corresponding to the afterglow interval selected for the oscilloscope 6 of the plant in order to ensure that the picture information recorded in each frame remains undisturbed by the afterglow of the preceding picture information.

The pulse P 34 released by the pulse P 32 B cancels via a branch a the blocking of an AND gate 41 at the same time blocking occurs via a branch *a* of the AND gate 35 the last-mentioned gate. AND gate 41 has, in addition to its branches *a* and *c*, a branch *b* to be fed with a pulse P 36 before the pulse P*b* from the countercircuit 37 is able to pass via a fourth branch *d* to the recording amplifier for the sound channel of same. Since P 34 is to open the AND gate 41 simultaneously with P 36, P 34 has to be so long that it is present together with P 36 while the pulse P*b* is recorded.

Assuming that five sectional views I–V have to be recorded, each consisting of amplitude level ranges *a–j*, the 50 frames recorded are divided into five groups by means of the picture synchronization pulses from the camera 8 and the starting pulse P 35 (main synchronization pulse) which corresponds to the first picture synchronization pulse, which is recorded on the soundtrack 52 of the signal carrier. Through a selection circuit 43, five groups of the picture pulses PBS are picked out, and the group to be recorded is coupled through a manual switch 44 for the views I–V connected with an AND gate 45, branch *a*. The switch 44 simultaneously controls the deflection voltages to the cathode ray tube of the oscilloscope 6, so that the five sectional views may be staggered stepwise in relation to each other by alteration of the direct current voltage of the deflecting plates of the oscilloscope. The 50 frames are placed in the five groups so that group 1 contains the frames No. 1- 6–11–16–21–26–31–36–41 and 46, whereas group 2 contains the frames 2–7–12 etc.

AND gate 45 will, when the branches *a* and *c* are open, permit a picture information pulse P 46 to pass from the ultrasonic device 2 of the system through level range gate 47*a* ... and pulse former 46 to the intensity modulation input of the oscilloscope 6. The branch *c* of the AND gate 45 is open after recording of line and picture synchronization pulses corresponding to 100 frames, a pulse P*a* from the countercircuit 37 being simultaneously transmitted to the branch *c* of AND gate 45. Thus, information from a total of 10 parallel sectional planes I–X may be recorded on the signal carrier.

The deflecting circuit of the oscilloscope 6 is controlled by the ultrasonic scanning unit 7 of the system.

The pulse P 46 is transmitted to the pulse former 46 by one of a number, for example 10, level range gates 47*a*, 47*b* .. 47*j*, in the said sequence, controlled by the 10-counter 42 which counts picture synchronization pulses PBS and itself readjusts from 10*j* to O. P 35 starts the counting and the selection of PBS, first PBS going to 47*a*, second PBS to 47*b* etc.

The level range gates 47*a*–47*j* are fed with the video signal from the video output *a* of the ultrasonic device 2. The amplifier of the ultrasonic device may be linear, logarithmic or exponential.

The level range gates are to be understood as gate circuits with two inputs, a first input for signals from the ultrasonic device and another input for the signal from 10-counter and selection circuits, adapted in such manner that the circuit emits a pulse when the first input is fed with signals from the ultrasonic device with amplitudes within the amplitude range corresponding to the circuit involved, provided, and only provided, another input is simultaneously fed with a signal from the 10-countercircuit corresponding to the amplitude level range.

The light signals appearing on the screen of the oscilloscope 6 are registered by the video camera 8 and transmitted to the pulse former 9 as a video signal PV containing the immediate position of the information pulse P 46 on the screen. The video signal PV is passed through the pulse former 9, which removes the synchronization signals from the video signal, partly through a switch circuit 11 to the video recorder 10, partly via a number of AND gates 48*a*, 48*b* ... 48*j* and the intensity regulation circuits 49*a*–49*j* to a video monitor 15. Synchronization pulses PBS and PLS are transmitted direct from video camera 8 to video monitor 14.

The switch circuit 11, which is controlled by the line blanking pulses PLB of the camera 8, couples the video recorder 10 for playback before the time at which there is one of the prerecorded line synchronization pulses PLS on the signal carrier 18. When the last-mentioned pulse PLS has been played back, the circuit 11 again switches to record, on the video recorder 10, the video signals P 9 transmitted via the pulse former 9.

The picture synchronization pulses PBS of the video camera 8 are, as mentioned, recorded on the synchronizing track 19 of the signal carrier 18, and these are available both during recording and during playback.

The line synchronization signal PLS and the picture synchronization signal PBS may prior to the actual recording be recorded on the signal carrier 18 in the form of all the synchronization signals for the 100 frames. During the recording these are utilized for synchronization of the camera 8, since it is of utmost importance that the video signals recorded during the scanning are recorded at the proper location in the proper track of the signal carrier 18. When playing back, the line and picture synchronization signals are used for synchronizing the video recorder 10.

PLAYBACK

The preferably endless signal carrier of the video recorder is put into motion in normal manner, and when normal velocity has been attained, the manual switch 20 is set, without activating the electric contact 31, in the position connecting the recorder 10 to the monitoi 14. By means of the other manual switch 44 the desired sectional view or views I, II ... to be reproduced are selected. The intensity regulating circuit or circuits **49*a*–49*j*** to be used are cut in and regulated until the video signal of each reproduced amplitude level range has the desired intensity.

I claim:

1. A method of recording, reproducing and analyzing picture information based on ultrasonic-pulse-echo sectional view examinations of inhomogeneous objects which consist of at least two materials or substances having internal joint surfaces abutting each other, and in which picture information corresponding to the outer surface of the object or body and echo pulses from the said internal joint surfaces are recorded on a signal carrier of magnetizable material by means of a video recorder with a view to subsequent reproduction and analysis of the picture information by means of a video monitor, comprising the steps of scanning an object with an ultrasonic transmit-receive device at different angles in a single sectional plane through said object to obtain picture information, successively recording the picture information of said scanning on a track of a signal carrier, and synchronously controlling said successive recordings to superimpose the picture information of said scan directly over said recording track as said scanning angle is changed, whereby superimposed synchronous recordings on the signal carrier can be reproduced on a video monitor.

2. A method as claimed in claim 1, further comprising the steps of reproducing on the video monitor a plurality of sectional views comprising picture information showing consecutive parallel sections of the object and recorded on the same signal carrier, and staggering said respective sectional views in a stepwise relation to one another on the video monitor, preferably the direction of the diagonal of the video monitor screen to produce a kind of axonometric representation on the screen of the video monitor.

3. Method as claimed in claim 2, further comprising the step of varying the light intensity at which the respective stepwise staggered sectional views are reproduced on the video monitor.

4. Method as claimed in claim 2, further comprising the step of varying the light intensity at which the respective stepwise staggered sectional views are reproduced on the video monitor by decreasing the intensity of successive views so that a first said sectional view has the greatest intensity of light and the subsequent sectional views are of an intensity of light decreasing stepwise.

5. A method as claimed in claim 1, further comprising the steps of coupling the sectional view picture information from the ultrasonic device to an oscilloscope to reproduce the picture information as brief light spot flashes on the viewing screen of the oscilloscope, providing the viewing screen with an afterglow of sufficient duration to ensure a video signal for each light spot, scanning the viewing screen with a video camera, and performing said recording step by recording the signals emitted by the video camera on the signal carrier.

6. A method as claimed in claim 5, characterized in that the picture information is split up and registered in a fixed number of consecutive pulse amplitude level ranges, the pulses corresponding to each particular level range being successively coupled through a separate AND gate and a pulse former to the oscilloscopic viewing screen, which has such an interval of afterglow that only the persistent picture last formed at any time and showing each individual light spot, but not persistent pictures originating from preceding pictures of corresponding echo pulses gives rise to a video signal by scanning by means of the video camera, the signals transmitted by the video camera being then recorded on the signal carrier as standard pulses having uniform amplitudes in a number of frames corresponding to the number of amplitude level ranges, each of the said frames corresponding to an amplitude level range, whereby one or more frames to suit requirements can be subsequently reproduced on the video monitor at a light intensity which is regulatable for each individual frame.

7. Method as claimed in claim 5, characterized in that the scanning operation of the video camera is controlled by line and picture synchronization pulses prerecorded on the signal carrier.

8. Method as claimed in claim 7, characterized in that the line and picture synchronization pulses produced by the video camera itself are recorded on the signal carrier prior to scanning the viewing screen, the synchronization signals thus recorded being utilized for controlling the scanning operation of the video camera during the subsequent registration of the picture information.

9. A system for reproducing sectional view information developed by an ultrasonic scanning device and converted into a video signal applied to an oscilloscope viewing screen in a fixed system of coordinates and on a fixed scale, comprising a video camera for optical coupling to an oscilloscope viewing screen which has such an interval of afterflow that only such persistent picture of each light spot as is the last formed, at any time, but not persistent picture originating from preceding pictures of corresponding echo pulses produces a video signal by scanning, said video camera having an output circuit, a manual switch having at least four contact position circuits a pulse former connected between said video camera output circuit and said manual switch, a video recorder connected to said video camera by one of said switch circuits a video monitor connected to said video camera by second one of said switch circuits, wherein at third one of said switch circuits connects the video camera both to the video recorder and to the video monitor, and a fourth one of said switch circuits connects the video recorder to the video monitor.

10. A system as claimed in claim 9, further comprising a pair of synchronizing terminals on said video camera, a pair of AND gates, a counter circuit a video head, and a picture synchronization head, said counter circuit being coupled to said AND gates, and said video and picture synchronization heads are coupled respectively through said video camera synchronizing terminals.

11. A system as claimed in claim 9, wherein said video camera has a synchronizing oscillator, a synchronizing circuit, and a delaying circuit connected between said synchronizing oscillator and synchronizing circuit.

12. A system as claimed in claim 9, further comprising a counter and selector circuit means for counting picture synchronization pulses, and a playback channel in the video recorder for picture synchronization pulses connected to said counter and selector means, a sound head in said video recorder and an AND gate connected to the sound head and to said counter and selector circuit means, a plurality of level range gates connected to said counter and selector means and having a set of input terminals for connection to said ultrasonic device, and a series combination of pulse former and an AND gate for connection to an intensity modulation input of the oscilloscope. .

13. A system as claimed in claim 12, characterized in that each individual level range gate is provided with amplitude selecting means.